(12) United States Patent
Minagawa

(10) Patent No.: US 7,315,102 B2
(45) Date of Patent: Jan. 1, 2008

(54) AXIAL GAP MOTOR

(75) Inventor: Yuusuke Minagawa, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/004,824

(22) Filed: Dec. 7, 2004

(65) Prior Publication Data

US 2005/0127769 A1    Jun. 16, 2005

(30) Foreign Application Priority Data

Dec. 15, 2003    (JP)    ............................. 2003-416591

(51) Int. Cl.
*H02K 21/24*    (2006.01)
*H02K 23/54*    (2006.01)

(52) U.S. Cl. ................. 310/156.32; 310/162; 310/268; 310/254

(58) Field of Classification Search ................ 310/268, 310/156.32–156.37, 162, 168, 254, 179
See application file for complete search history.

(56) References Cited

U.S. PATENT DOCUMENTS

| | | | | |
|---|---|---|---|---|
| 3,633,055 A | * | 1/1972 | Maier | ..................... 310/156.26 |
| 3,688,306 A | * | 8/1972 | Oishi et al. | .................... 341/15 |
| 3,978,356 A | * | 8/1976 | Spiesberger | ........... 310/156.42 |
| 5,245,238 A | * | 9/1993 | Lynch et al. | ................ 310/116 |
| 5,619,087 A | * | 4/1997 | Sakai | ......................... 310/268 |
| 2002/0171324 A1 | * | 11/2002 | Smith et al. | ................ 310/268 |

FOREIGN PATENT DOCUMENTS

| | | |
|---|---|---|
| JP | 61-81773 U | 5/1986 |
| JP | 3-49545 A | 3/1991 |
| JP | 3-289342 A | 12/1991 |
| JP | 8-256441 A | 10/1996 |
| JP | 11-187635 A | 7/1999 |

* cited by examiner

*Primary Examiner*—Karl Tamai
*Assistant Examiner*—David W. Scheuermann
(74) *Attorney, Agent, or Firm*—Foley & Lardner LLP

(57) ABSTRACT

An axial gap motor is described which comprises a rotor shaft rotatable about its axis in case. A rotor is fixed to the rotor shaft to rotate therewith. The rotor includes a plurality of magnets. A stator is disposed about the rotor shaft at a position to coaxially face the rotor. The stator includes a plurality of coils. The magnets of the rotor have each opposed pole faces that extend in a direction other than a direction that is perpendicular to the axis of the rotor shaft.

18 Claims, 8 Drawing Sheets

AXIAL GAP MOTOR

BACKGROUND OF THE INVENTION

1. Field of the Invention

The present invention relates in general to electric motors and motor particularly to the motors of an axial gap type, which comprises a rotor shaft that is rotatable about its axis, at least one rotor that is fixed to the rotor shaft to rotate therewith and at least one stator that is disposed about the rotor shaft and axially spaced from the rotor.

2. Description of the Related Art

Hitherto, various axial cap motors have been proposed and put into practical use particularly in the field of power generators that need high power density and low thermal generation. One of them is shown in Japanese Laid-open Patent Application (Tokkaihei) 11-187635.

In order to clarify the task of the present invention, one conventional axial gap motor will be briefly described with the aid of FIGS. 10 and 11 of the accompanying drawings.

As is seen from FIG. 10, the axial gap motor 51 comprises a case 55, a rotor shaft 52 rotatably disposed in case 55, an annular rotor 53 fixed to rotor shaft 52 to rotate therewith and a stator 54 arranged about rotor shaft 52 at a position to face rotor 53. Axially spaced two bearings 56 are employed for rotatably supporting rotor shaft 52 relative to case 55. Rotor 53 comprises a rotor back core 57, twelve flat plate magnets 58 and a rotor core 59 which are assembled to constitute one unit.

As is understood from FIG. 11, the twelve flat plate magnets 58 are of a flat plate type and are flatly held by rotor core 58 in such a manner that major flat surfaces of flat plate magnets 58 constitute an imaginary plane that is perpendicular to the axis X of rotor shaft 52. As is seen from FIG. 10, stator 54 comprises a stator back core 60, a stator core 61 and stator coils 62 which are assembled to constitute one unit. As shown, between stator 54 and rotor 53, there is defined a certain gap 63. Near one axial end of rotor shaft 52, there is arranged an encoder 64 that detects a rotation speed (or angular position) of rotor shaft 52. Case 55 is formed with a water jacket 65 through which cooling water flows to cool the motor 51. Rotor back core 57 functions to turn a looped magnetic flux about the axis X of rotor shaft 52. That is, for operating the motor 51, a looped magnetic flux that has passed through one group of flat plate magnets 58 is needed to turn in a circumferential direction for passing through the other group of flat plate magnets 58 and stator 54 next.

FIG. 11 is an enlarged view of a part of rotor 53 taken from gap 63 between stator 54 and rotor 53 (see FIG. 10). As shown, with the presence of twelve flat plate magnets 58, rotor 53 has twelve poles, six N-poles and six S-poles alternately arranged. These flat plate magnets 58 are exposed at their main surfaces to gap 63 that is defined between stator 54 and rotor 53.

SUMMARY OF THE INVENTION

In axial gap motor 51 mentioned hereinabove, the output or power of the same depends substantially on quantity of magnetism possessed by rotor 53. Thus, when higher output is required, it is necessary to increase the number of flat plate magnets 58. However, due to the nature of the flat arrangement of flat plate magnets 58 that has been explained hereinabove, increasing the number of the magnets 58 directly brings about enlargement in size of rotor 53. Of course, in this case, the axial gap motor 51 becomes bulky.

Furthermore, due to its inherent construction, the motor 51 tends to have even magnetic resistance and thus practical usage of a reluctance torque is poor. Furthermore, usage of rotor back core 57 increases the cost of motor 51.

Accordingly, an object of the present invention is to provide an axial gap motor which is free of the above-mentioned drawbacks.

That is, according to the present invention, there is provided an axial gap motor which can effectively use a reluctance torque and thus generate a higher power without increasing the size of the motor.

In accordance with a first aspect of the present invention, there is provided an axial gap motor which comprises a rotor shaft rotatable about its axis; a rotor fixed to the rotor shaft to rotate therewith, the rotor including a plurality of magnets; and a stator disposed about the rotor shaft at a position to coaxially face the rotor, the stator including a plurality of coils, wherein the magnets of the rotor have each opposed pole faces that extend in a direction other than a direction that is perpendicular to the axis of the rotor shaft.

In accordance with a second aspect of the present invention, there is provided an axial gap motor which comprises a case; a rotor shaft rotatably installed in the case, the rotor shaft having an axis about which the rotor shaft is rotatable; an annular rotor fixed to the rotor shaft to rotate therewith, the annular rotor including a plurality of magnets which are arranged about the axis of the rotor shaft at equally spaced intervals; and an annular stator disposed about the rotor shaft at a potion to coaxially face the annular rotor, the annular stator including a plurality of coils which are arranged about the axis of the rotor shaft at evenly spaced intervals, wherein the magnets of the annular rotor are of a flat plate type and opposed pole faces of each magnet extend in a direction other than a direction that is perpendicular to the axis of the rotor shaft.

In accordance with a third aspect of the present invention, there is provided an axial gap motor which comprises a case; a rotor shaft rotatably installed in the case, the rotor shaft having an axis about which the rotor shaft is rotatable; an annular rotor fixed to the rotor shaft to rotate therewith, the annular rotor including a plurality of magnets which are arranged about the axis of the rotor shaft at equally spaced intervals; and first and second annular stators disposed about the rotor shaft at positions to put therebetween the annular rotor, each of the first and second annular stators including a plurality of coils which are arranged about the axis of the rotor shaft at evenly spaced intervals, wherein the magnets of the annular rotor are of a flat plate type and opposed pole faces of each magnet extend in a direction other than a direction that is perpendicular to the axis of the rotor shaft.

BRIEF DESCRIPTION OF THE DRAWINGS

FIGS. 3A and 3B are drawings showing one example of a rotor employable in the present invention, in which FIG. 3A is a front view of the rotor and FIG. 3B is a perspective view of the rotor;

DETAILED DESCRIPTION OF THE EMBODIMENTS

In the following, embodiments of the present invention will be described with reference to the accompanying drawings.

For ease of understanding, various directional terms, such as, right, left, upper, lower, rightward and the like are used in the following explanation. However, such terms are to be understood with respect to a drawing or drawings on which corresponding portion or part is shown.

Figure 1:
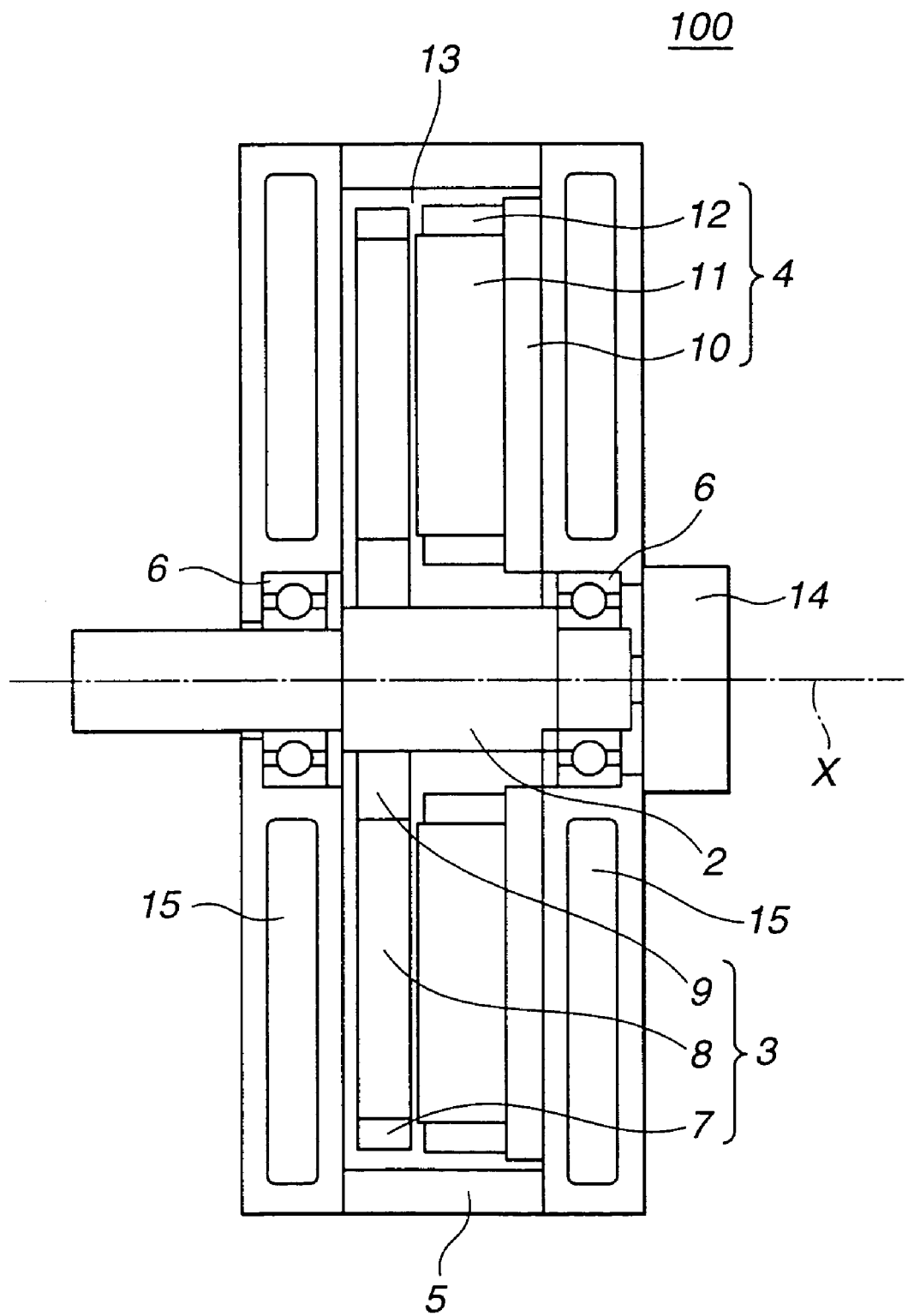
FIG. 1 is a sectional view of an axial gap motor of single rotor-single stator type, which is a first embodiment of the present invention.

Referring to FIG. 1 of the drawings, there is shown in a sectional form an axial gap motor 100 of single rotor-single stator type, which is a first embodiment of the present invention.

Axial gap motor 100 of this first embodiment comprises a case 5, a rotor shaft 2 rotatably installed in case 5, an annular rotor 3 concentrically disposed on rotor shaft 2 to rotate therewith and a stator 4 concentrically arranged about rotor shaft 52 at a position to coaxially face rotor 3.

Two bearings 6 are held on axially spaced portions of case 5 to rotatably support rotor shaft 2 relative to case 5, as shown.

Annular rotor 3 comprises a rotor ring 7, twelve magnets 8 and a rotor core 9 which are assembled to constitute one unit. Rotor core 9 is made of a pressed iron-powder, through which magnetism can penetrate. The detail of the annular rotor 3 will be described hereinafter.

Stator 4 comprises a stator back core 10, a stator core 11 and stator coils 12 which are assembled to constitute one unit.

Stator back core 10 is arranged to fix stator core 11 to case 5 and functions to turn a looped magnetic flux of stator core 11 about the axis X of rotor shaft 2.

Stator coils 12 are arranged on equally spaced portions of a peripheral edge of stator core 11.

As shown, between stator 4 and rotor 3, there is defined a certain gap 13.

Near a right axial end of rotor shaft 2, there is arranged an encoder 14 that detects a rotation speed (or angular position) of rotor shaft 2.

Case 5 is formed with a water jacket 15 through which cooling water flows to cool entire construction of motor 100.

In axial gap motor 100 of this first embodiment, the annular rotor 3 has a unique structure as will be described in the following.

Figure 3A:
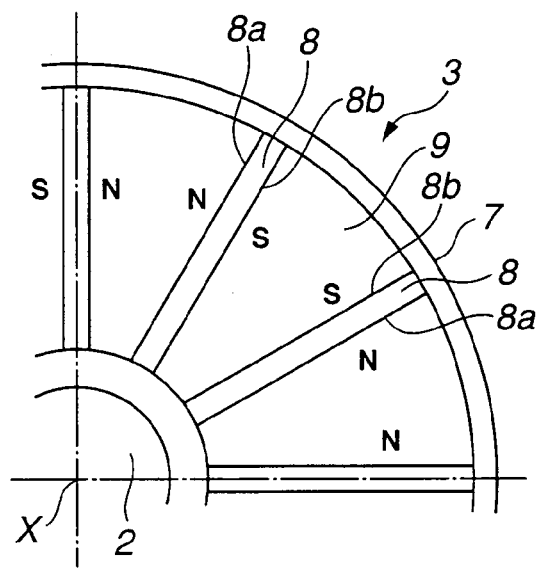
Figure 3B:
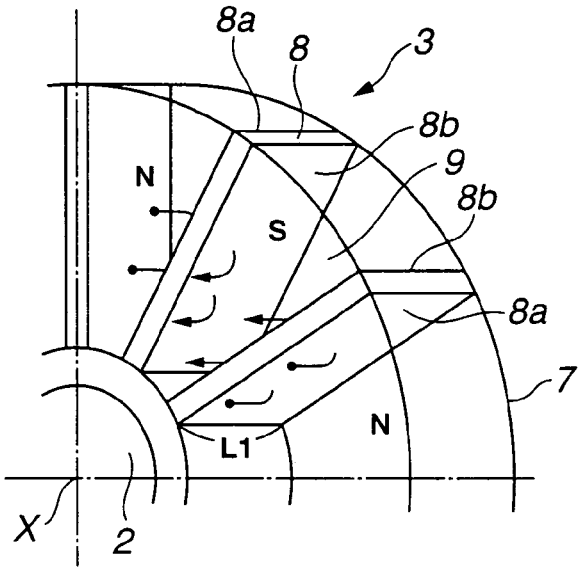

As is seen from FIGS. 3A and 3B, especially FIG. 3B, in annular rotor 3, each of magnets 8 held by rotor ring 7 and rotor core 9 is shaped into a flat rectangular plate.

As is best understood from FIG. 3B, the twelve flat plate magnets 8 are arranged about the axis X of rotor shaft 2 at evenly spaced intervals, and thus, the entire construction of annular rotor 3 is shaped like a water wheel. That is, in an assembled condition, opposed two major flat surfaces 8a and 8b (or pole faces) of each of the magnets 8 are perpendicular to an imaginary plane (not shown) that is perpendicular to the axis X of rotor shaft 2. In other words, the major flat surfaces 8a and 8b of the magnets 8 are perpendicular to an imaginary plane (not shown) that is substantially defined by the gap 13.

Furthermore, in the illustrated example, adjacent two of the magnets 8 are all arranged in a reversed way regarding N-S position. That is, as shown, adjacent two of the magnets 8 are all arranged in such a manner that mutually facing major surfaces (or mutually facing pole faces) thereof have the same polarity for example, respective N-polarity or respective S-polarity.

As is seen from FIG. 3B, in operation, flow of magnetic fluxes are produced, each flowing from N-pole to S-pole through the corresponding magnet 8.

It is to be noted that in annular rotor 3 of FIG. 3B, each of flat plate magnets 8 has two opposed major surfaces 8a and 8b.

The advantages of the annular rotor 3 employed in the first embodiment 100 will be apparent from the following description when taken in conjunction with FIGS. 4A and 4B and FIGS. 5A and 5B.

Figure 4A:
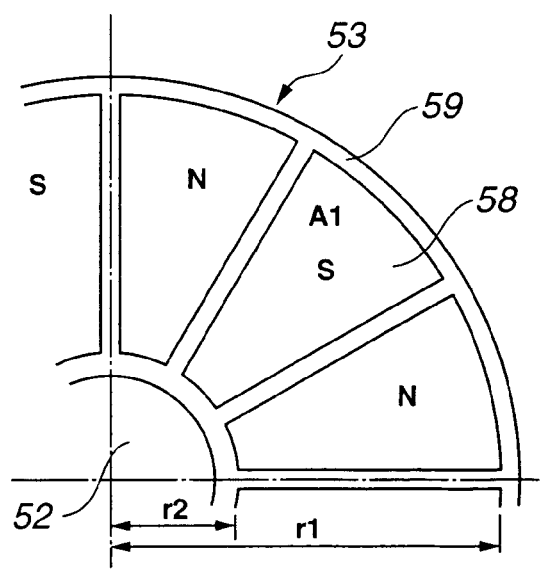
FIGS. 4A and 4B are drawings respectively showing a conventional rotor and the rotor of FIG. 3B.
Figure 4B:
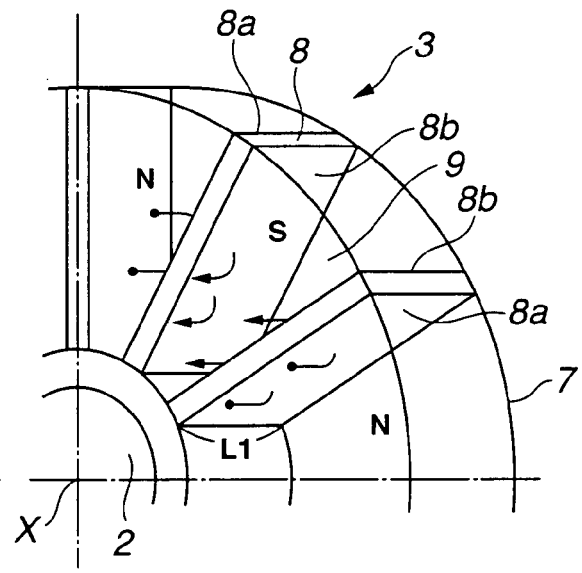

Now, consideration will be directed to both the rotor 53 of FIG. 4A and the rotor 3 of FIG. 4B with respect to their sizes.

Figure 11:
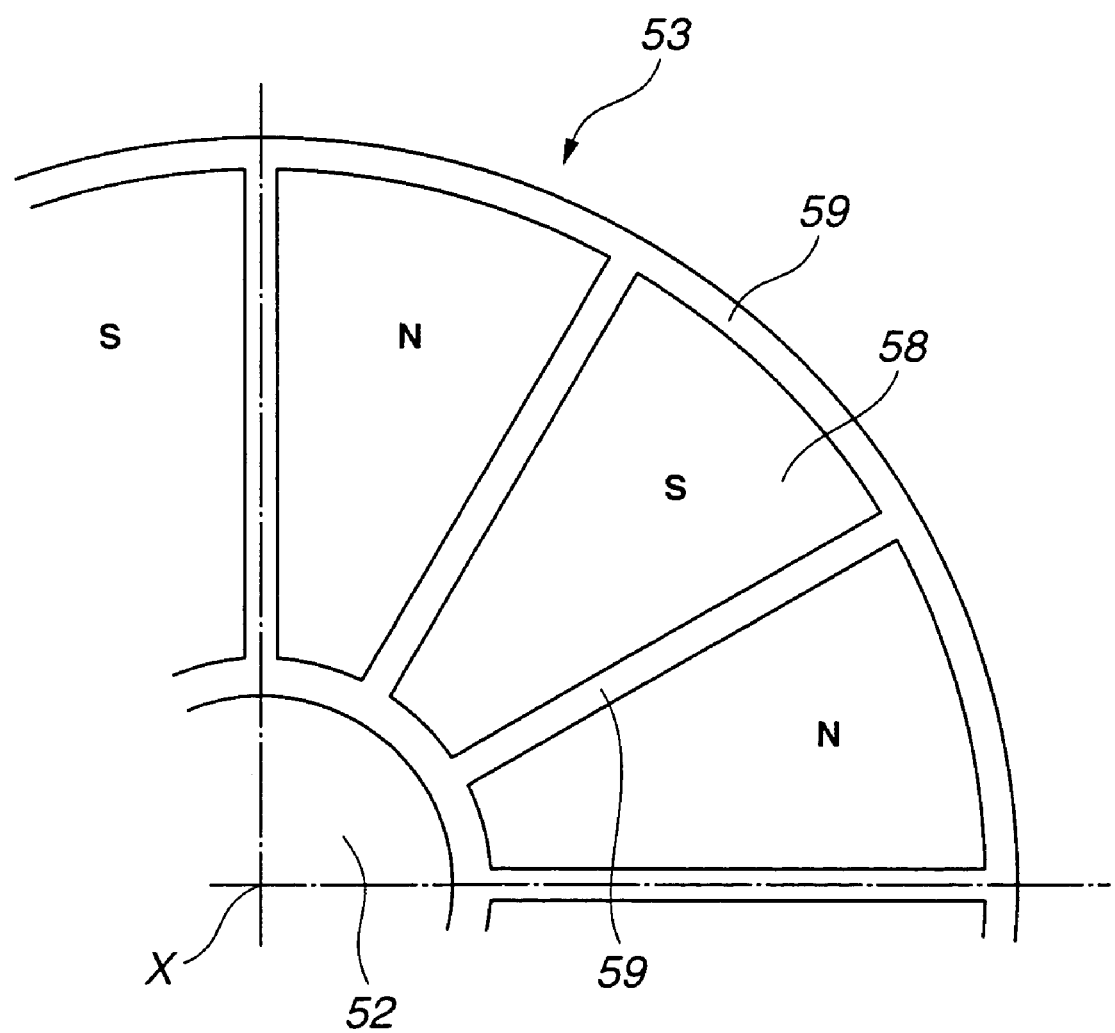
FIG. 11 is an enlarged and partial plan view of a rotor employed in the conventional axial gap motor.

FIG. 4A shows the arrangement of the above-mentioned related art of FIG. 11, and FIG. 4B shows the arrangement in the first embodiment 100.

Assuming that rotor 53 of FIG. 4A is so sized that outer and inner radiuses r1 and r2 of rotor core 59 are 100 mm and 25 mm respectively, each of flat plate magnets 58 has an area A1 of about 1472 mm². While, if rotor 3 of FIG. 4B is needed to have the same quantity of magnetism as rotor 53 of FIG. 4A, the axial length L1 of each flat pate magnet 8 of rotor 3 is calculated to about 9.8 mm from the following equation:

$$L1 = A1/2(r1-r2) \tag{1}$$

Figure 10:
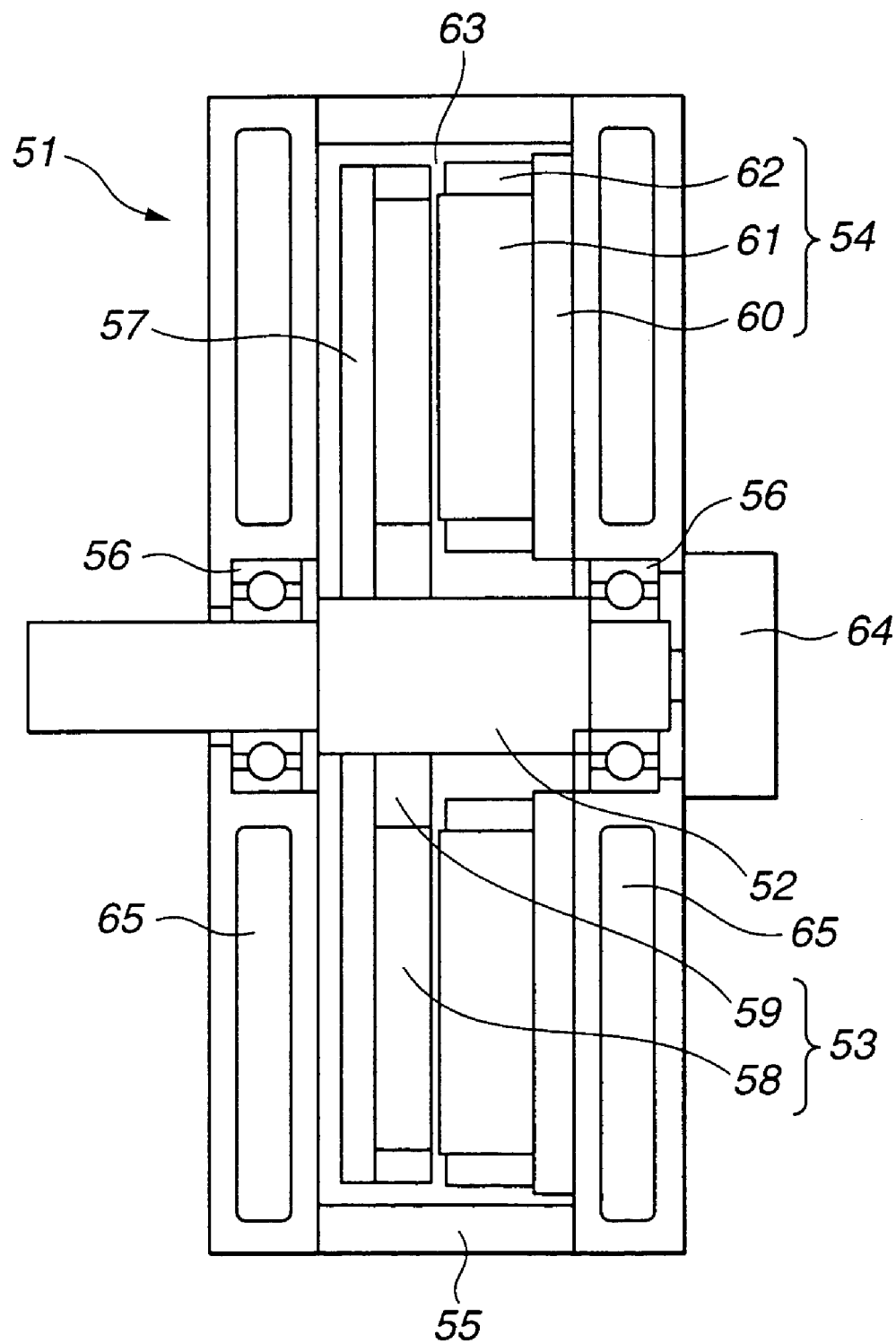
FIG. 10 is a sectional view of a conventional axial gap motor.

That is, by increasing the axial length of the entire construction of axial gap motor 100 by at most 9.8 mm, the motor 100 of the first embodiment can exhibit the same quantity of magnetism as the axial gap motor 51 of FIG. 10.

Figure 5B:
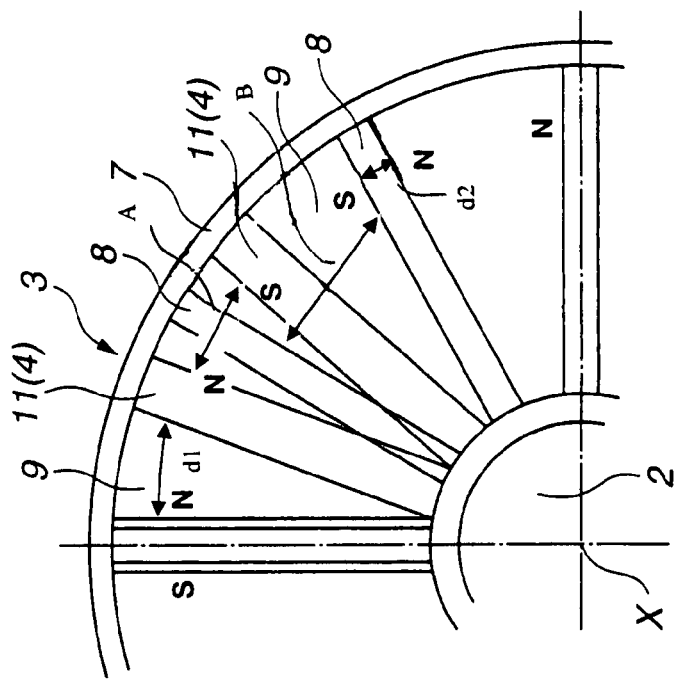
FIGS. 5A and 5B are drawings similar to FIGS. 4A and 4B, but each showing a positional relation between magnets of rotor and a stator core.
Figure 5A:
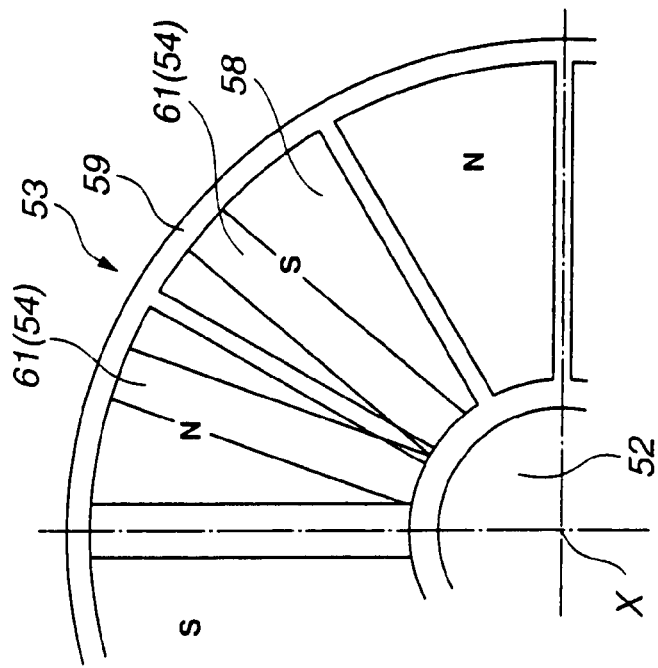

Now, consideration will be directed to a produced torque on both the conventional motor 51 with rotor 53 and the motor 100 with rotor 3 with reference to FIGS. 5A and 5B.

FIG. 5A shows a positional relation between each magnet 58 of rotor 53 and stator core 61 of stator 54 (see FIG. 11), and FIG. 5B shows a positional relation between each magnet 8 of rotor 3 and stator core 11 of stator 4 (see FIG. 1).

Figure 8:
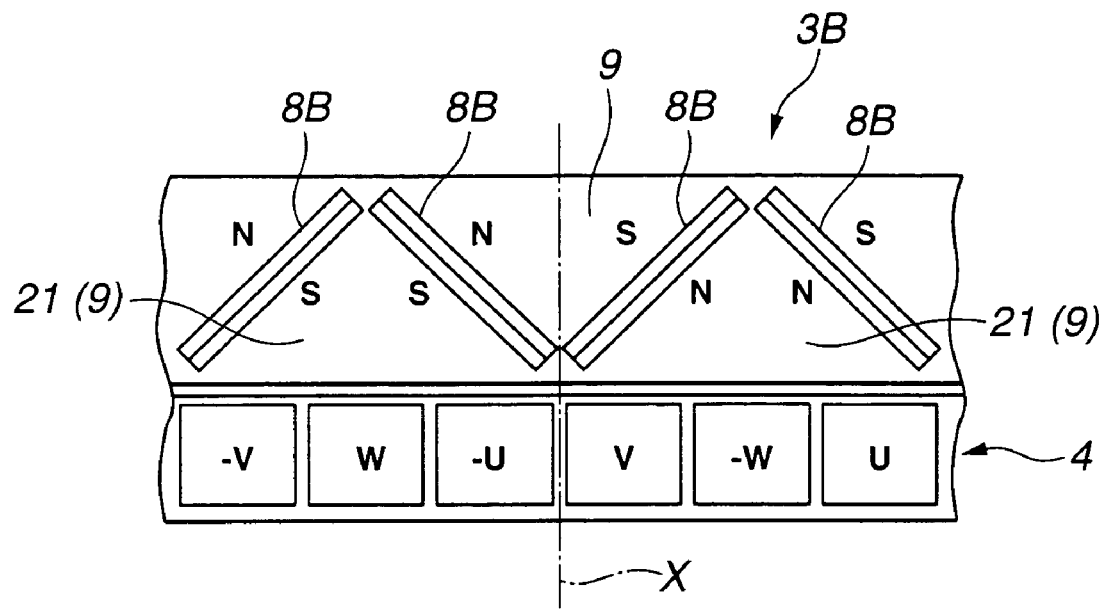
FIG. 8 is a development elevation of the single rotor-single stator type axial gap motor to which the second modification of rotor of FIG. 7 is practically applied.

In the conventional positional relation shown in FIG. 5A, the magnetic fluxes (see FIG. 10) run axially from stator 54 toward rotor 53 passing through the perpendicularly facing flat plate magnets 58 and constitute looped magnetic fluxes. In this conventional relation, spaces defined between elements of stator core 61 face the pole faces of flat plate magnets 58, and thus, the gap 63 fails to have any portion through which Q-axis magnetic flux passes. Thus, the conventional axial gap motor 51 hardly produces a reluctance torque. While, in the unique positional relation shown in FIG. 5B, stator core 11 of stator 4 has two (viz., first and second) groups of paired elements of stator core 11, in which the paired elements of the first group are incorporated with one of the magnets 8 and those of the second group are incorporated with a part of rotor core 9 which is put between adjacent two magnets 8. As is known, the first group can produce a magnetic toque and the second group can produce a reluctance torque. In FIG. 8, angle A indicates the angle between stator cores 11, angle B indicates an angle between rotor magnets 8, d1 indicates a distance between stator cores at an outermost radial portion of the stator cores, and d2 indicates a circumferential thickness of rotor magnet 8.

Figure 6:
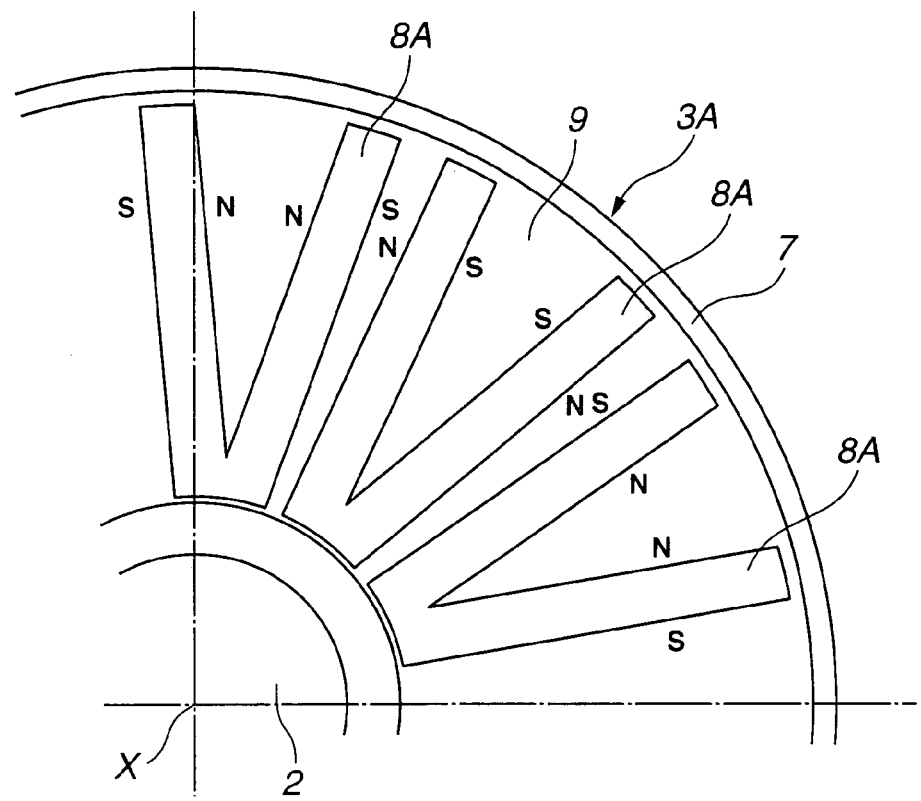
FIG. 6 is a front view of a first modification of the rotor employable in the present invention.

FIG. 6 shows a first modification 3A of annular rotor 3 employed in the axial gap motor 100 of the first embodiment. As shown from the drawing, in this modification, each magnet 8A includes two mutually angled rectangular plate portions that have radially inner ends thereof integrated. Thus, each magnet 8A has a generally V-shaped cross section.

As shown, upon assembly, the twelve magnets 8A are arranged about the axis X of rotor shaft 2 at evenly spaced intervals having the integrated bottom portions of the two rectangular plate portions of each magnet 8A directed toward the axis X of rotor shaft 2. Furthermore, the two mutually angled rectangular plate portions of each magnet 8A have mutually facing major surfaces that have the same polarity N (or S) and mutually opposed major surfaces that have the same polarity S (or N). Furthermore, as shown, adjacent two magnets 8A are so arranged that mutually closed rectangular plate portions of the two magnets 8A have mutually facing major surfaces that have different polarities S and N (or N and S).

In this modification, the magnetism produced by annular rotor 3A is much effectively used, particularly in single rotor-double stator type axial gap motor which will be described hereinafter.

It is to be noted that in both the annular rotors 3 and 3A, the quantity of magnetism can be increased without increasing the diameter of the motor 100, for the reason as has been mentioned hereinabove. Furthermore, the gap 13 (see FIG. 1) faces rotor core 9 of rotor 3 (and 3A) that is constructed by pressed iron-powder, a reluctance torque is effectively produced by the motor 100, which promotes increase in power of the motor 100.

Figure 7:
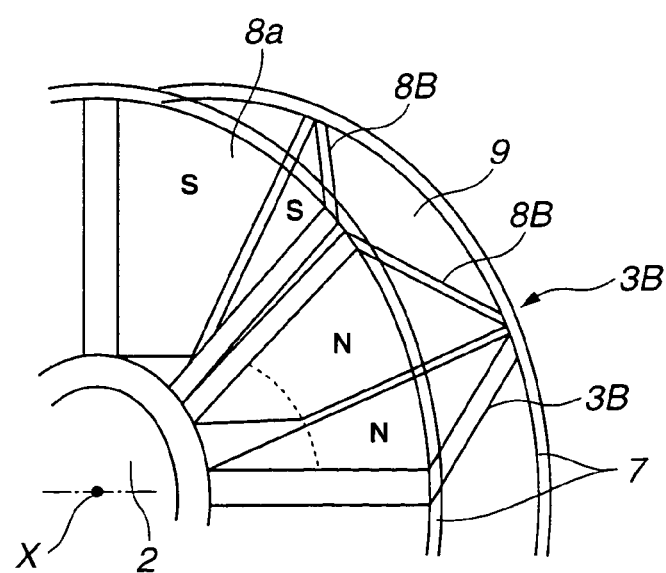
FIG. 7 is a perspective view of a second modification of the rotor employable in the present invention.

FIG. 7 shows a second modification 3B of annular rotor employed in the axial gap motor 100 of the first embodiment. In this modification, each flat plate magnet 8B is angled relative to an imaginary plane (not shown) that extends perpendicular to the axis X of rotor shaft 2. More specifically, as is understood from the drawing, adjacent two of the flat plate magnets 8B are angled to each other and angled with respect to an imaginary plane that extends in parallel with the axis X of rotor shaft 2 with one paired pole faces N-N (or S-S) facing forward and the other paired pole faces S-S (or N-N) facing rearward.

In the second modification 3B of annular rotor, the quantity of magnetism is much increased due to a three-dimensional arrangement of the magnets 8B in rotor 3B. Of course, in this modification, the major surface of each magnet 8B can be much increased. Furthermore, in this modification, the distance from the major surface of each magnet 8B to the stator 4 is reduced, and thus, the magnetic resistance is reduced increasing the quantity of magnetic fluxes. Furthermore, because the thickness of rotor 3B is reduced, the volume of motor 100 is reduced and thus the power density of motor 100 is increased.

Advantages possessed by motor 100 that employs the second modification 3B of rotor of FIG. 7 will be much easily understood from FIG. 8. This drawing is a development elevation of the single rotor-single stator type axial gap motor 100 to which the modified rotor 3B of FIG. 7 is practically applied.

As is seen from this drawing, stator 4 has stator teeth each having a V-shape coil, W-phase coil or U-phase coil mounted therearound. One unit including three types of coils V, W and U is in incorporation with paired magnets 8B that are angled to open toward the unit. In the drawing, each part of rotor core 9 that is substantially enclosed by paired magnets 8B and the unit of coils V, W and U is denoted by numeral 21(9). As is understood from this drawing, the paired magnets 8B that are angled to each other have mutually facing surfaces that carry the same polarity N (or S) and the other surfaces that carry the other same polarity S (or N).

Figure 2:
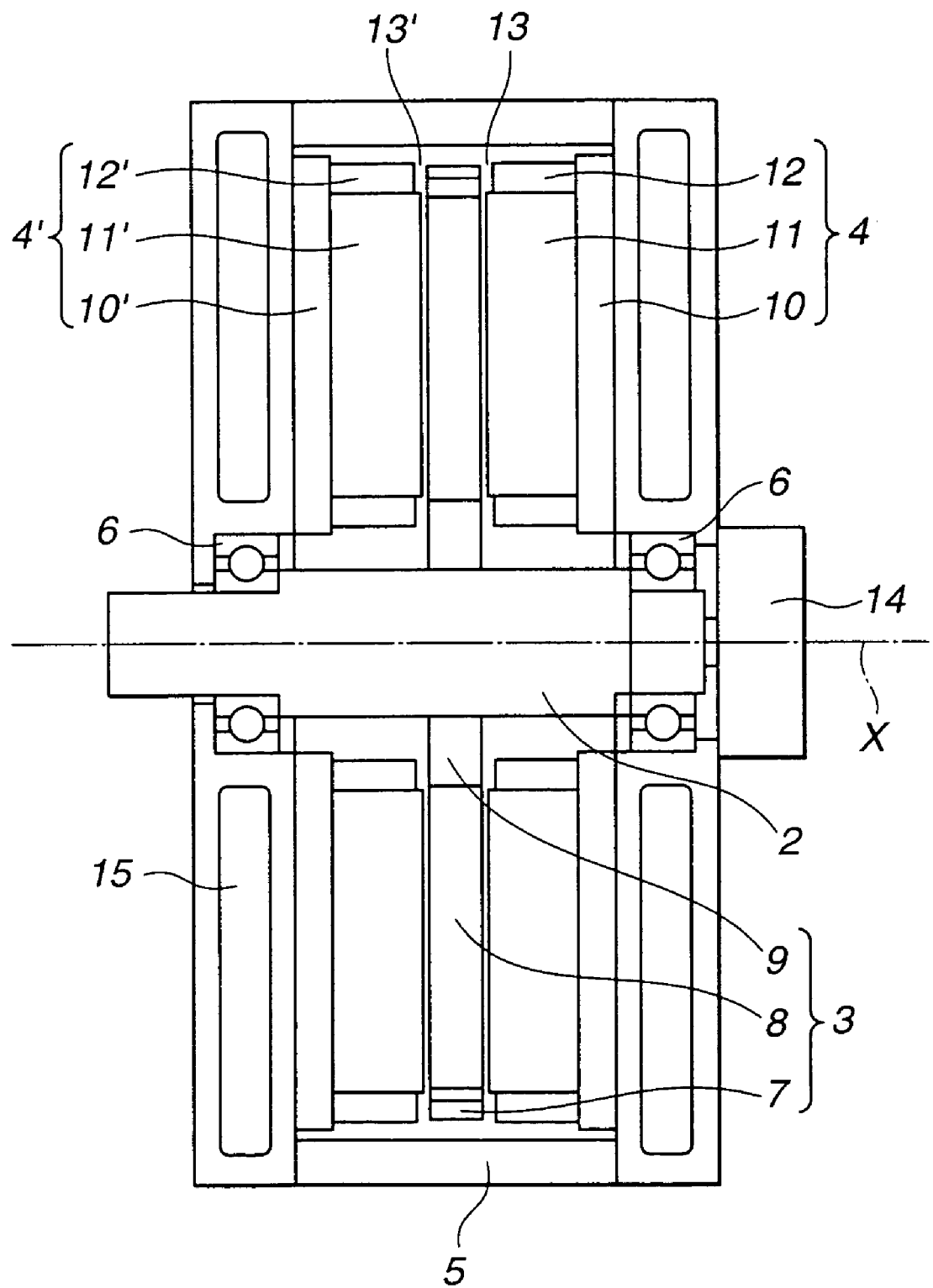
FIG. 2 is a sectional view of an axial gap motor of single rotor-double stator type, which is a second embodiment of the present invention.

Referring to FIG. 2, there is shown in a sectional form an axial gap motor 200 of single rotor-double stator type, which is a second embodiment of the present invention.

Since axial gap motor 200 of this second embodiment is similar to the above-mentioned motor 100 of the first embodiment, only portions or parts that are different from those of the motor 100 will be described in detail in the following.

That is, in the second embodiment 200, an additional stator 4' is further employed, which is arranged at an axially opposite position of stator 4 with respect to rotor 3. For easy clarification, these two stators 4 and 4' will be called first and second stators in the following description.

First and second stators 4 and 4' are substantially the same in construction. That is, like stator 4, stator 4' comprises a stator back core 10', a stator core 11' and stator coils 12' which are assembled to constitute one unit. Stator back core 10' is arranged to fix stator core 11' to case 5 and functions to turn a looped magnetic flux of stator core 11' about the axis X of rotor shaft 2. Stator coils 12' are arranged on equally spaced portions of a peripheral edge of stator core 11'.

As shown, first and second stators 4 and 4' are coaxially disposed about rotor shaft 2 having rotor 3 put therebetween. A certain gap 13 is defined between stator 4' and rotor 3, like the gap 13 between stator 4 and rotor 3.

As rotor 3, the above-mentioned rotors 3, 3A and 3B respectively shown in FIGS. 3B, 6 and 7 are usable.

Figure 9:
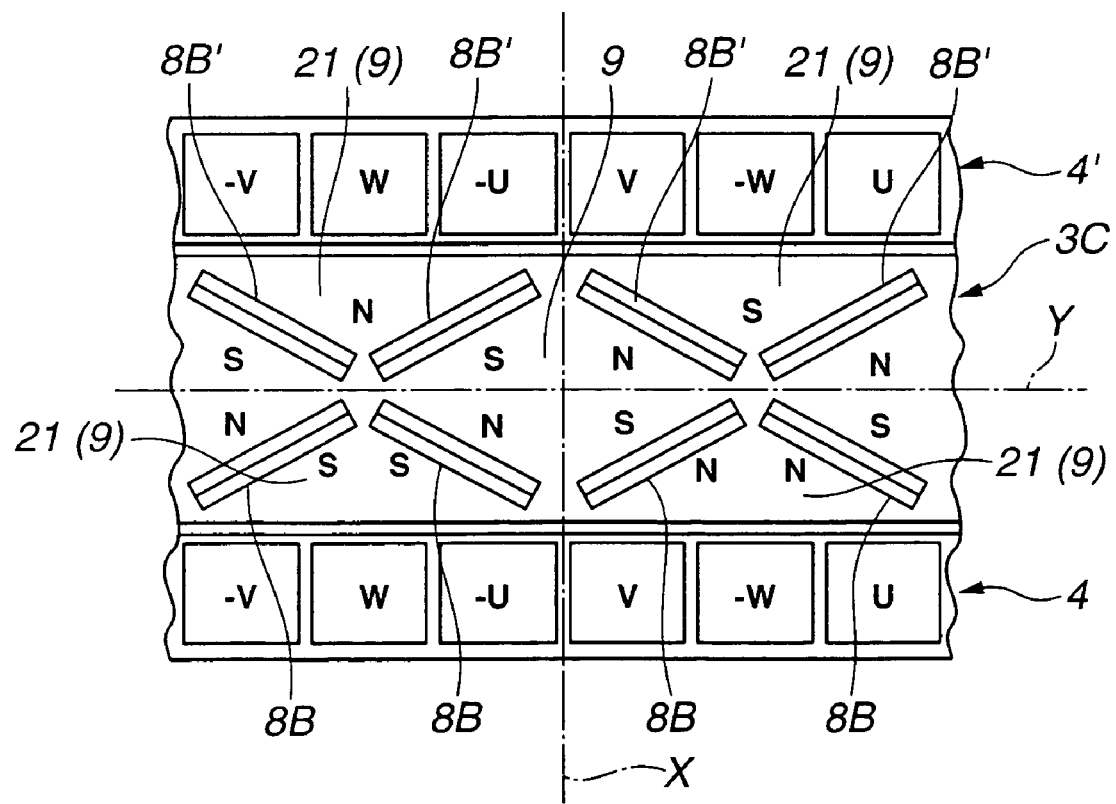
FIG. 9 is a development elevation of the single rotor-double stator type axial gap motor to which a third modification of rotor is practically applied.

FIG. 9 is a development elevation of single rotor-double stator type axial gap motor 200 to which a third modification 3C of annular rotor is practically applied.

As is understood from this drawing, the third modification 3C of rotor has, in addition to the group of the above-mentioned paired magnets 8B, another group of paired magnets 8B' that are incorporated with the additional stator 4'. As shown, the two groups of paired magnets 8B and 8B' are symmetrically arranged with respect to an imaginary plane Y that is perpendicular to the axis X of rotor shaft 2, and mutually facing major surfaces of the two groups of paired magnets 8B and 8B' have different polarities, that is, N-polarity and S-polarity or S-polarity and N-polarity, as shown.

Because of employment of two stators 4 and 4', the quantity of magnetism produced by the motor 200 of this embodiment is increased as compared with the motor 100 and thus the motor 200 can generate a higher power than the motor 100. Particularly, the motor 200 employing the third modification 3C of rotor can generate much high power due to employment of two groups of paired magnets 8B and 8B' in addition to the two stators 4 and 4'.

The entire contents of Japanese Patent Application 2003-416591 filed Dec. 15, 2003 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. An axial gap motor comprising:
a rotor shaft rotatable about its axis;
a rotor fixed to the rotor shaft to rotate therewith, the rotor including a plurality of magnets that are arranged about the axis of the rotor shaft at evenly spaced intervals; and
a stator disposed about the rotor shaft at a position to coaxially face the rotor, the stator including a stator core and a plurality of coils, the stator core including a plurality of equally spaced paired elements on which the coils are respectively arranged;
wherein the magnets of the rotor have each opposed pole faces that extend in a direction other than a direction that is perpendicular to the axis of the rotor shaft;
wherein the magnets of the rotor are of a flat plate type, each magnet having two major flat surfaces that extend in parallel with the axis of the rotor shaft;
wherein an angle defined between the paired elements of the stator core is smaller than an angle defined between two adjacent rotor magnets;
wherein a distance between adjacent elements of the paired elements of the stator core at an outermost radial portion of the paired elements is greater than a circumferential thickness of each magnet of the rotor.

2. An axial gap motor as claimed in claim 1, in which adjacent two of the magnets are arranged in such a manner that mutually facing major surfaces thereof bear the same polarity.

3. An axial gap motor as claimed in claim 2, in which the magnets are housed in a holder structure including a rotor core and a rotor ring, so that the rotor is shaped like a water wheel.

4. An axial gap motor as claimed in claim 1, in which each of the magnets includes two mutually angled rectangular plate portions with radially inner ends integrated, so that the magnet has a generally V-shaped cross section, and in which the magnets are arranged about the axis of the rotor shaft at evenly spaced intervals having the integrated inner ends of the two plate portions of each magnet directed toward the axis of the rotor shaft.

5. An axial gap motor as claimed in claim 4, in which the two mutually angled rectangular plate portions of each magnet have mutually facing major surfaces that have the same polarity and mutually opposed major surfaces that have the other same polarity.

6. An axial gap motor as claimed in claim 5, in which adjacent two magnets are so arranged that mutually close rectangular plate portions of the two magnets are mutually facing major surfaces that have different polarities.

7. An axial gap motor as claimed in claim 1, in which the magnets of the rotor are of a flat plate type and in which adjacent two of the flat plate magnets are angled to each other and angled with respect to an imaginary plane that extends in parallel with the axis of the rotor shaft with one paired mutually facing pole faces facing in a first direction and the other paired mutually opposed pole faces facing in a second direction.

8. An axial gap motor as claimed in claim 1, further comprising an additional stator that is disposed about the rotor shaft at a position opposite to said stator with respect to the rotor.

9. An axial gap motor as claimed in claim 8, in which each of the magnets includes two mutually angled rectangular plate portions with radially inner ends integrated, so that the magnet has a generally V-shaped cross section, and in which the magnets are arranged about the axis of the rotor shaft at evenly spaced intervals having the integrated inner ends of the two plate portions of each magnet directed toward the axis of the rotor shaft.

10. An axial gap motor as claimed in claim 8, in which the magnets of the rotor are of a flat plate type and include first and second groups of magnets which are positioned at axially different portions with respect to the axis of the rotor shaft.

11. An axial gap motor as claimed in claim 10 in which adjacent two of the flat plate magnets of the first group are angled to each other and angled with respect to an imaginary plane that extends in parallel with the axis of the rotor shaft with one paired mutually facing pole faces facing in a first direction and the other paired mutually opposed pole faces facing in a second direction and in which adjacent two of the flat plate magnets of the second group are angled to each other and angled with respect to the imaginary plane with one paired mutually facing pole faces facing in the second direction and the other paired mutually opposed pole faces facing in the first direction.

12. An axial gap motor as claimed in claim 8, in which the stator and the additional stator each comprise a stator back core, a stator core and stator coils which are assembled to constitute one unit, in which the stator coils are arranged on equally spaced portions of a peripheral edge of the stator core, and in which the stator coils include a U-phase coil, a V-phase coil and a W-phase coil.

13. An axial gap motor as claimed in claim 1, in which the stator comprises a stator back core, a stator core and stator coils which are assembled to constitute one unit, in which the stator coils are arranged on equally spaced portions of a peripheral edge of the stator core, and in which the stator coils include a U-phase coil, a V-phase coil and a W-phase coil.

14. An axial gap motor as claimed in claim 1, wherein the distance between the paired elements of the stator core is a distance between the paired elements of the stator core along an outer circumference of the stator core.

15. An axial gap motor comprising:
a case;
a rotor shaft rotatably installed in the case, the rotor shaft having an axis about which the rotor shaft is rotatable;
an annular rotor fixed to the rotor shaft to rotate therewith, the annular rotor including a plurality of magnets which are arranged about the axis of the rotor shaft at equally spaced intervals; and
an annular stator disposed about the rotor shaft at a position to coaxially face the annular rotor, the annular stator including a stator core and a plurality of coils which are arranged about the axis of the rotor shaft at evenly spaced intervals, wherein the stator core includes a plurality of equally spaced paired elements on which the coils are respectively arranged;
wherein the magnets of the annular rotor are of a flat plate type and opposed pole faces of each magnet extend in a direction other than a direction that is perpendicular to the axis of the rotor shaft;

wherein each magnet has two major flat surfaces that extend in parallel with the axis of the rotor shaft;

wherein an angle defined between the paired elements of the stator core is smaller than an angle defined between two adjacent annular rotor magnets;

wherein a distance between adjacent elements of the paired elements of the stator core at an outermost radial portion of the paired elements is greater than a circumferential thickness of each magnet of the rotor.

16. An axial gap motor as claimed in claim 15, wherein the distance between the paired elements of the stator core is a distance between the paired elements of the stator core along an outer circumference of the stator core.

17. An axial gap motor comprising:

a case;

a rotor shaft rotatably installed in the case, the rotor shaft having an axis about which the rotor shaft is rotatable;

an annular rotor fixed to the rotor shaft to rotate therewith, the annular rotor including a plurality of magnets which are arranged about the axis of the rotor shaft at equally spaced intervals; and first and second annular stators disposed about the rotor shaft at positions to put therebetween the annular rotor, each of the first and second annular stators including a stator core and a plurality of coils which are arranged about the axis of the rotor shaft at evenly spaced intervals, wherein the stator core includes a plurality of equally spaced paired elements on which the coils are respectively arranged;

wherein the magnets of the annular rotor are of a flat plate type and opposed pole faces of each magnet extend in a direction other than a direction that is perpendicular to the axis of the rotor shaft;

wherein each magnet has two major flat surfaces that extend in parallel with the axis of the rotor shaft;

wherein an angle defined between the paired elements of the stator core is smaller than an angle defined between two adjacent annular rotor magnets;

wherein a distance between adjacent elements of the paired elements of the stator core at an outermost radial portion of the paired elements is greater than a circumferential thickness of each magnet of the rotor.

18. An axial gap motor as claimed in claim 17, wherein the distance between the paired elements of the stator core is a distance between the paired elements of the stator core along an outer circumference of the stator core.

* * * * *